(12) United States Patent
Hundemer

(10) Patent No.: US 10,289,677 B2
(45) Date of Patent: May 14, 2019

(54) SYSTEMS AND METHODS FOR USING A PROGRAM SCHEDULE TO FACILITATE MODIFYING CLOSED-CAPTIONING TEXT

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 14/626,598

(22) Filed: Feb. 19, 2015

(65) Prior Publication Data

US 2016/0246765 A1    Aug. 25, 2016

(51) Int. Cl.
| | |
|---|---|
| H04N 1/00 | (2006.01) |
| H03M 7/00 | (2006.01) |
| H03M 7/30 | (2006.01) |
| G06F 17/27 | (2006.01) |
| G06F 16/783 | (2019.01) |
| G06F 17/28 | (2006.01) |
| G06F 17/24 | (2006.01) |
| G06F 17/21 | (2006.01) |

(Continued)

(52) U.S. Cl.
CPC ........ *G06F 17/273* (2013.01); *G06F 16/7844* (2019.01); *G06F 17/2765* (2013.01); *G06F 16/739* (2019.01); *G06F 16/745* (2019.01); *G06F 17/211* (2013.01); *G06F 17/24* (2013.01); *G06F 17/289* (2013.01)

(58) Field of Classification Search
CPC ...................................................... G06F 17/24
USPC .......................................................... 715/257
See application file for complete search history.

(56) References Cited

U.S. PATENT DOCUMENTS

| | | |
|---|---|---|
| 5,543,851 A | 8/1996 | Chang |
| 5,774,859 A | 6/1998 | Houser et al. |

(Continued)

FOREIGN PATENT DOCUMENTS

WO    2010-120439 A1    10/2010

OTHER PUBLICATIONS

The International Search Report (ISR) with Written Opinion for PCT/US2016/018303 dated June 20, 2016.

(Continued)

*Primary Examiner* — Cesar B Paula
*Assistant Examiner* — Luu-Phuong T Nguyen
(74) *Attorney, Agent, or Firm* — McDonnell Boehnen Hulbert & Berghoff LLP

(57) ABSTRACT

In one aspect, an example method involves: a computing device selecting a media program; the computing device accessing first data representing closed-captioning text that corresponds to the media program; accessing second data representing a program schedule of the selected media-program, wherein the program schedule comprises first text; the computing device selecting second text from among the first text; the computing device using the selected second-text to (i) identify a candidate misspelled-term within the closed-captioning text, and (ii) identify a candidate replacement-term for the candidate misspelled-term; and the computing device outputting, via a user interface, a prompt requesting a command to modify the closed-captioning text by replacing the identified candidate misspelled-term with the identified candidate replacement-term.

20 Claims, 6 Drawing Sheets

(51) Int. Cl.
*G06F 16/738* (2019.01)
*G06F 16/74* (2019.01)

(56) References Cited

U.S. PATENT DOCUMENTS

| | | | |
|---|---|---|---|
| 6,243,676 B1 | 6/2001 | Witteman | |
| 6,961,954 B1* | 11/2005 | Maybury | G06F 17/30787 |
| | | | 707/999.003 |
| 7,215,436 B2 | 5/2007 | Hull et al. | |
| 7,412,441 B2 | 8/2008 | Scott, III et al. | |
| 9,444,862 B2 | 9/2016 | Prakash et al. | |
| 2001/0003214 A1* | 6/2001 | Shastri | G06F 17/30796 |
| | | | 725/109 |
| 2002/0092022 A1 | 7/2002 | Dudkicwicz | |
| 2005/0225674 A1 | 10/2005 | Lynch | |
| 2008/0052069 A1* | 2/2008 | Flanagan | G06F 17/289 |
| | | | 704/235 |
| 2008/0064326 A1 | 3/2008 | Foster | |
| 2008/0252780 A1* | 10/2008 | Polumbus a/k/a Tad Polumbus | H04N 17/00 |
| | | | 348/468 |
| 2008/0295040 A1 | 11/2008 | Crinon | |
| 2011/0072466 A1* | 3/2011 | Basso | G06F 17/30796 |
| | | | 725/47 |
| 2011/0164673 A1 | 7/2011 | Shaffer | |
| 2011/0283243 A1 | 11/2011 | Eckhardt | |
| 2012/0016675 A1 | 1/2012 | Hopkins et al. | |
| 2012/0143606 A1* | 6/2012 | Pham | G10L 15/26 |
| | | | 704/235 |
| 2012/0304057 A1* | 11/2012 | Labsky | G10L 13/08 |
| | | | 715/256 |
| 2013/0114899 A1* | 5/2013 | Ambwani | G06F 17/30796 |
| | | | 382/176 |
| 2013/0317818 A1 | 11/2013 | Bigham et al. | |
| 2014/0044413 A1 | 2/2014 | Wallace | |
| 2014/0059586 A1 | 2/2014 | Shusman | |
| 2016/0173814 A1* | 6/2016 | Fonseca, Jr. | H04N 7/0882 |
| | | | 348/468 |

OTHER PUBLICATIONS

The International Search Report (ISR) with Written Opinion for PCT/US2016/018307 dated June 16, 2016.
U.S. Appl. No. 14/626,592, filed Feb. 19, 2015.
United States Patent and Trademark Office Advisory Action, for U.S. Appl. No. 15/818,720 dated Jul. 20, 2018.
United States Patent and Trademark Office Non-Final Office Action, for U.S. Appl. No. 14/626,592 dated Jul. 14, 2016.
United States Patent and Trademark Office Non-Final Office Action, for U.S. Appl. No. 14/626,592 dated Jan. 3, 2017.
United States Patent and Trademark Office Final Office Action, for U.S. Appl. No. 14/626,592 dated Jun. 13, 2017.
U.S. Appl. No. 15/818,720, filed Nov. 20, 2017.
United States Patent and Trademark Office Non-Final Office Action, for U.S. Appl. No. 15/818,720 dated Dec. 20, 2017.
United States Patent and Trademark Office Final Office Action, for U.S. Appl. No. 15/818,720 dated Apr. 9, 2018.
United States Patent and Trademark Office Non-Final Office Action, for U.S. Appl. No. 15/818,720 dated Aug. 24, 2018.
United States Patent and Trademark Office Final Office Action, for U.S. Appl. No. 15/818,720 dated Dec. 7, 2018.
United States Patent and Trademark Office Notice of Allowance, for U.S. Appl. No. 15/818,720 dated Feb. 3, 2019.

* cited by examiner

300

Block A

A1.    National News Story: President Signs Budget Bill

A2.    Local News Story: John Smith Wins Lottery

CG Template: T1, CG-Template Text: John Smith

Block B

B1.    Weather: Viewing Area Battered with Severe Storms

B2.    Local Body Shop Sees Increase in Business Due to Hail Damage

Block C

C1.    Sports News Story: Chicago Shooters Team Win Championship

CG Template: T2, CG-Template Text: Chicago Shooters

FIG. 3

SYSTEMS AND METHODS FOR USING A PROGRAM SCHEDULE TO FACILITATE MODIFYING CLOSED-CAPTIONING TEXT

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

Closed-captioning is a video-related service that was developed for the hearing-impaired. When closed-captioning is enabled, a media program and closed-captioning text (CC text) representing an audio portion of the media program are displayed as the media program is played. The CC text may represent, for example, spoken dialog or sound effects of the media program, thereby helping a viewer to comprehend what is being presented in the media program. Closed-captioning may also be disabled such that the media program may be displayed without the CC text.

CC text may be generated in a variety of manners. For example, a computer-based automatic speech-recognition system may convert spoken dialog into text. Another technique may involve an individual listening to an audio portion of a media program and manually typing out corresponding text. This individual is sometimes referred to as a "captioner."

Regardless of which method is used to generate the CC text, errors in the CC text may be present due to human error, the relatively short time allotted for captioning in real time, or various other reasons.

After the CC text is generated, it may be encoded and stored in the form of closed-captioning data (CC data). CC data may then be embedded in or otherwise associated with the corresponding media program. In some cases, a broadcast system may add the CC data to a video portion of the media program, for example in line 21 of an analog format broadcast according to the National Televisions Systems Committee (NTSC) standard, and may then broadcast the updated media program to an audience.

SUMMARY

In a first aspect, an example method involves: a computing device selecting a media program; the computing device accessing first data representing CC text that corresponds to the media program; the computing device accessing second data representing a program schedule of the selected media-program, wherein the program schedule comprises first text; the computing device selecting second text from among the first text; the computing device using the selected second-text to (i) identify a candidate misspelled-term within the CC text, and (ii) identify a candidate replacement-term for the candidate misspelled-term; and the computing device outputting, via a user interface, a prompt requesting a command to modify the CC text by replacing the identified candidate misspelled-term with the identified candidate replacement-term.

In a second aspect, an example method involves: a computing device selecting a media program; the computing device accessing first data representing CC text that corresponds to the media program; the computing device accessing second data representing a program schedule of the selected media-program, wherein the program schedule comprises first text; the computing device selecting second text from among the first text; the computing device using the selected second-text to (i) identify a candidate misspelled-term within the CC text, and (ii) identify a candidate replacement-term for the candidate misspelled-term; and the computing device generating and storing third data representing the CC text modified to have the identified candidate misspelled-term replaced with the identified candidate replacement-term.

In a third aspect, an example non-transitory computer-readable medium has stored thereon program instructions that when executed cause a computing device to perform a set of acts including: selecting a media program; accessing first data representing CC text that corresponds to the media program; accessing second data representing a program schedule of the selected media-program, wherein the program schedule comprises first text; selecting second text from among the first text; using the selected second-text to (i) identify a candidate misspelled-term within the CC text, and (ii) identify a candidate replacement-term for the candidate misspelled-term; and outputting, via a user interface, a prompt requesting a command to modify the CC text by replacing the identified candidate misspelled-term with the identified candidate replacement-term.

BRIEF DESCRIPTION OF THE DRAWINGS

FIG. 3 is a schematic diagram illustrating an example program schedule according to the present disclosure.

DETAILED DESCRIPTION

I. Overview

Figure 1:
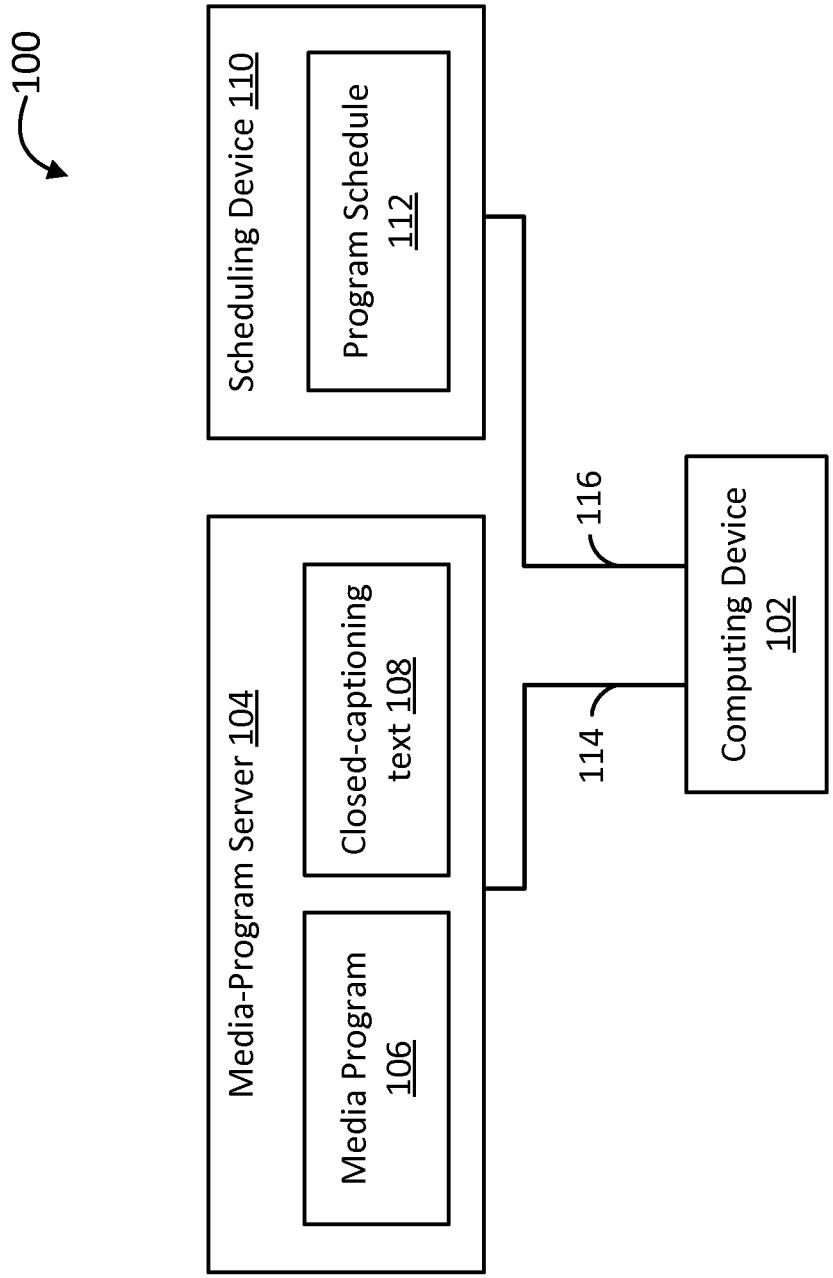
FIG. 1 is a simplified block diagram illustrating an example system according to the present disclosure.

A media program may be broadcast along with corresponding CC text. The media program and the corresponding CC text may also be stored so that they can be rebroadcast at a later time. In some instances, the stored CC text may contain errors, such as grammatical or spelling mistakes. As such, the CC text rebroadcast at a later time may contain the same errors.

In order to address this issue, according to the present disclosure, a computing device may use text from a program schedule to determine that there are errors in the CC text. Further, the computing device may facilitate modifying the CC text to correct such errors.

A program schedule of a media program is a schedule or a summary of the media program, and is typically used to facilitate the production of the media program, such as by coordinating the use of various media-content items. In one example, the program schedule may include text corresponding to a sequence of media-program portions that make up the media program. Further, the program schedule may include text for an anchorperson to read aloud as the media program progresses. In addition, the program schedule may include information included as part of character generator (CG) templates. Such information may include, for example, text to be added to a CG template. This text may be referred to as "CG-template text."

In some cases, the CG-template text may be spoken by an anchorperson during a broadcast of the media program. As such, it may be heard by a captioner generating the CC text, and thus included in the CC text corresponding to the media program. Given this, it may be beneficial to use the CG-template text (or any other program-schedule text) to identify errors in the CC-text corresponding to the media program.

According to the present disclosure, an example method may involve a computing device (i) selecting a media program, (ii) accessing first data representing CC text that corresponds to the media program, (iii) accessing second data representing a program schedule of the selected media-program, wherein the program schedule comprises first text, (iv) selecting second text from among the first text, and (v) using the selected second-text to (a) identify a candidate misspelled-term within the CC text, and (b) identify a candidate replacement-term for the candidate misspelled-term.

The example method may further involve outputting, via a user interface, a prompt requesting a command to modify the CC text by replacing the identified candidate misspelled-term with the identified candidate replacement-term.

Alternatively, or in addition, the method may involve generating and storing third data representing the CC text modified to have the identified candidate misspelled-term replaced with the identified candidate replacement-term.

Other approaches and variations are possible and contemplated within the scope of this disclosure. For example, the method may further involve extracting from the first text, third text that satisfies one or more criterion, and selecting, as the second text, the extracted third-text. By way of example, the first text may include all text included within a program schedule, and the method may involve extracting from that text, all text meeting one or more criteria, such as that the text includes a proper noun, that the text meets a threshold length, and/or that the text begins with a capital letter, for example.

In one example, the act of using the selected second text to (i) identify the candidate misspelled-term within the CC text, and (ii) identify the candidate replacement-term for the candidate misspelled-term may involve modifying an electronic dictionary by adding the selected second-text to the electronic dictionary, and using the modified electronic-dictionary to facilitate both identifications.

In another example, the method may involve receiving, via the user interface, the command to modify the CC text by replacing the identified candidate misspelled-term with the identified candidate replacement-term, and responsive to receiving the command, generating and storing third data representing the CC text modified to have the identified candidate misspelled-term replaced with the identified candidate replacement-term.

In one example, the act of outputting method may involve outputting via a display device. In addition, the media program may be a news program.

II. Example System

FIG. 1 is a simplified block diagram illustrating an example system 100 according to the present disclosure. The system 100 may include a computing device 102, a media-program server 104, and a scheduling device 110. The media-program server 104 may store a media program 106 and CC text 108. The scheduling device 110 may store a program schedule 112. The components of the system 100 may be connected with each other and/or with other devices (or systems) via one or more communication paths. For example, a communication path 114 may connect the computing device 102 to the media-program server 104. In addition, the communication path 116 may connect the computing device 102 to the scheduling device 110. Each communication path may traverse a communication network.

Through these communication paths, a device may transmit various types of data to one or more other devices. For example, one device may transmit instructions to a second device to control the second device. As another example, one device may transmit a media stream and/or CC data to another device. Such devices and systems may exchange data according to one or more standards or protocols. For example, one device may transmit data to another device in the form of a packet stream.

The media-program server 104 may take many different forms such as a hard-disk drive (HDD), compact disc (CD), digital video disc (DVD), digital tape, or non-volatile flash memory such as a flash drive, secure digital (SD) card, or other storage mediums. The media-program server 104 may also include any form of volatile memory, including random access memory (RAM), for example. Further, media-program server 104 may be integrated with one or more other devices or systems, may be shared between one or more devices or systems (i.e., an internal memory for the entire system), or may be separate from the described devices or systems.

The media program 106 may be stored in the media-program server 104. The media program 106 may include audio and/or video, and may take the form of a news program, sporting event, or other type of program. The media program 106 may be stored in an encoded video file format such as MPEG-2 or MPEG-4, for example. The media program 106 may also be stored in a compressed format.

The CC text 108 may also be stored in the media-program server 104. The CC text 108 may include text generated by a captioner listening to an audio portion of the media program 106, text generated using speech-to-text recognition software, or any other mechanism for converting audio to text. The CC text 108 may correspond to the media program 106. The media-program server 104 may include a storage scheme (e.g., specific pointers or addressing) such that the media program 106 and the CC text 108 are stored together, in a combined file or adjacent files, for example, or otherwise linked together.

The scheduling device 110 may take any form described above with reference to the media-program server 104. The program schedule 112 may be a schedule or a summary of the media program 106, and is typically used to facilitate the production of the media program, such as by coordinating the use of various media content items. In one example, the program schedule 112 may include text corresponding to a sequence of media-program portions that make up the media program 106. Further, the program schedule 112 may include text for an anchorperson to read aloud as the media program 106 progresses. In addition, the program schedule 112 may include information included as part of character generator (CG) templates. Such information may include, for example, CG-template text.

Computing device 102 may be implemented as computing device 200, for example, and may be configured for performing various operations including, for example, the operations contained in this disclosure.

The computing device 102 may be configured to select a media program. In one example, computing device 102 may select the media program 106, perhaps based on user input received via a user interface.

The computing device 102 may also be configured to access first data representing CC text that corresponds to the selected media-program 106. For example, computing device 102 may communicate with the media-program server 104 via the communication path 114 to access data representing the CC text 108.

The computing device 102 may further be configured to access second data representing a program schedule of the selected media-program 112, wherein the program schedule includes first text. For example, the computing device 102 may communicate with the scheduling device 110 via communication path 116 to access data representing the program schedule 112. The computing device 102 may receive information related to the program schedule 112. The first text may include text scheduled to be displayed on a teleprompter, media-program portion titles, and/or CG-template text, for example.

The computing device 102 may further be configured to select second text from among the first text. For example, computing device 102 may extract from the first text, third text that satisfies one or more criterion, and select, as the second text, the extracted third-text. In some examples, the criterion may be that the third text includes a proper noun, that the third text meets a threshold length, and/or that the third text begins with a capital letter, for example.

In some examples, the selected second text may be materially similar, but not identical to the CC text that corresponds to the media program. The similarity may allow the computing device to more easily identify a candidate misspelled-term and/or a candidate replacement-term.

The computing device 102 may be configured to use the selected second-text to (i) identify a candidate misspelled-term within the CC text, and (ii) identify a candidate replacement-term for the candidate misspelled-term. In one example, computing device 102 may identify a candidate misspelled-term by using an electronic dictionary. The electronic dictionary may include terms often used or likely to be used by a captioner generating CC text. The computing device 102 may compare the CC text to the terms included in the electronic dictionary, and, if there is not a match for a given CC-text term, the computing device 102 may identify that term as a candidate misspelled-term.

In another example, the computing device 102 may modify an electronic dictionary by adding the selected second-text to the electronic dictionary. The computing device 102 may then use the modified electronic-dictionary to identify the candidate misspelled-term. In this case, computing device 102 may compare the terms in the modified electronic-dictionary to the CC text, and identify candidate misspelled-terms in this manner. One advantage of using the modified electronic-dictionary is that computing device 102 can have greater accuracy in identifying a candidate misspelled-term. Other methods of identifying a candidate misspelled-term are possible as well.

The computing device 102 may also identify a candidate replacement-term for the candidate misspelled-term using an electronic-dictionary. In one example, the computing device 102 may determine a candidate misspelled-term as described above. The computing device 102 may then determine that the closest correctly-spelled term included in the electronic dictionary is the candidate replacement-term.

Alternatively, the computing device 102 may modify the electronic dictionary by adding the selected second-text to the electronic dictionary, and then use the modified electronic-dictionary to determine that the closest correctly-spelled term included in the electronic dictionary is the candidate replacement-term. Other techniques may be used to identify a candidate replacement-term as well.

The computing device 102 may further be configured to output, via a user interface, a prompt requesting a command to modify the CC text by replacing the identified candidate misspelled-term with the identified candidate replacement-term. In one example, the computing device 102 may include a display device such as a computer screen, monitor, touch-sensitive display, for example, and the computing device 102 may display the prompt on the display device. In another example, the computing device 102 may output the prompt via an audio-output system, a haptic feedback system, or another output mechanism.

The prompt may include the identified candidate misspelled-term as well as the identified candidate replacement-term. The prompt may also request from a user a command to replace the identified candidate misspelled-term with the identified candidate replacement-term. The requested command may be received by computing device 102 via a user interface.

The computing device 102 may further be configured to receive a command, such as the command indicated above, and perform an act responsive to receiving command. In one example, in response to receiving the comment, the computing device 102 may generate and store third data representing the CC text modified to have the identified candidate misspelled-term replaced with the identified candidate replacement-term. The third data may be stored in the media-program server 104 in place of the CC text 108. Alternatively, the third data may be stored as a new CC-text in the media-program server 104 (i.e., stored in addition to the CC-text 108).

The computing device 102 may generate and store the third data in response to receiving the command. Alternatively, computing device 102 may automatically generate and store the third data, without receiving an input command.

Figure 2:
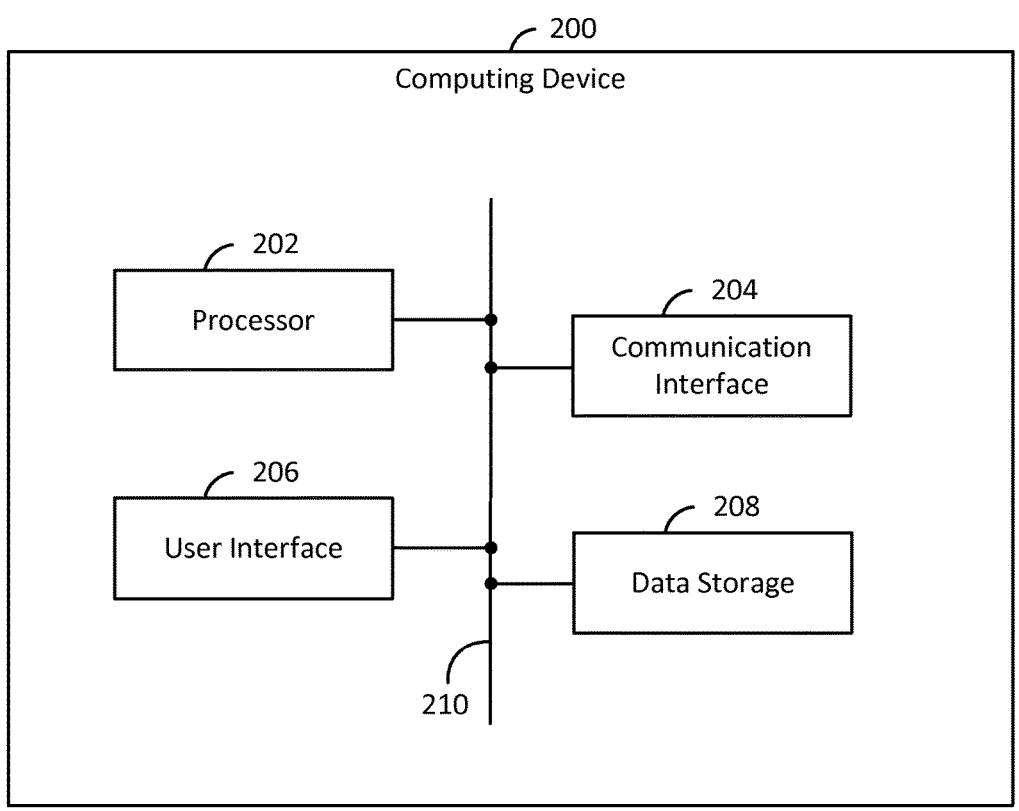
FIG. 2 is a simplified block diagram illustrating an example computing device according to the present disclosure.

FIG. 2 is a simplified block diagram illustrating an example computing device 200 according to the present disclosure. The computing device 200 may represent the media-program server 104, the scheduling device 110, and/or the computing device 102, for example. The computing device 200 may be configured for performing a variety of functions or acts, such as those described in this disclosure (including the accompanying drawings). The computing device 200 may include various components, including for example, a processor 202, a communication interface 204, a user interface 206, and a data storage 208. The components of computing device 200 may be communicatively connected to each other (or other devices or systems) via a system bus, network, or other connection mechanism 210.

The processor 202 may include a general purpose processor (e.g., a microprocessor) and/or a special purpose processor (e.g., a digital signal processor (DSP)).

The communication interface 204 may be configured to allow computing device 200 to communicate with one or more devices (or systems) according to one or more protocols. In one example, the communication interface 204 may be a wired interface, such as an Ethernet interface. As another example, the communication interface 204 may be a wireless interface, such as a cellular or WI FI interface.

The user interface 206 may facilitate interaction with a user of computing device 200, if applicable. As such, the user interface 206 may include input components such as a keyboard, a keypad, a mouse, a touch sensitive panel, a microphone, and a camera, and output components such as a display device (which, for example, may be combined with a touch sensitive panel), a sound speaker, and a haptic feedback system.

The data storage 208 may include one or more volatile, non-volatile, removable, and/or non-removable storage components, such as magnetic, optical, or flash storage, and may be integrated in whole or in part with the processor 202. Further, the data storage 208 may take the form of a non-transitory computer-readable storage medium, having stored thereon program instructions (e.g., compiled or non-compiled program logic and/or machine code) that, when executed by the processor 202, cause computing device 200 to perform one or more functions or acts, such as those described in this disclosure. Such program instructions may define or be part of a discrete software application that can be executed in response to certain inputs received from the user interface 206, for instance. The data storage 208 may also store other types of information or data, such as those types described throughout this disclosure.

FIG. 3 is a schematic diagram illustrating an example program schedule 300 according to the present disclosure. The program schedule 300 may include text organized into an outline or schedule of a media program. For example, Block A may include news stories A1 and A2, Block B may include news stories B1 and B2, and Block C may include news story C1. As shown, the program schedule 300 may include, for news story A2, an indication of a CG Template, namely "T1," and corresponding CG-template Text, namely "John Smith." Accordingly, when this CG template is used during the A2 portion of the news program, the text "John Smith" may be overlaid on a part of the A2 portion (that shows John Smith). Similarly, the program schedule 300 may include, for news story C1, an indication of a CG Template, namely "T2," and corresponding CG-Template Text, namely "Chicago Shooters." When this CG template is used during the C1 portion of the news program, the text "Chicago Shooters" may be overlaid on a part of the C1 portion (that shows the Chicago Shooters team).

Figure 4A:
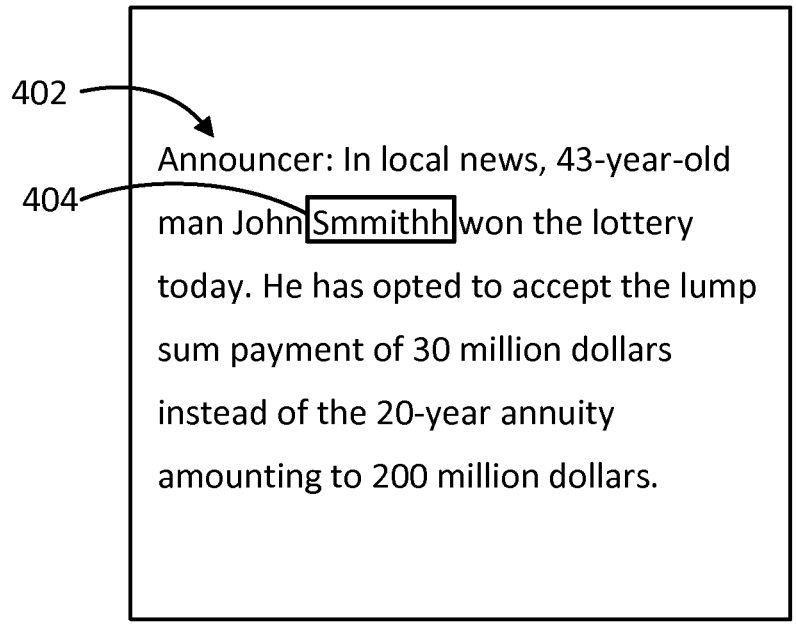
FIG. 4a is a schematic diagram illustrating example CC-text.
Figure 4B:
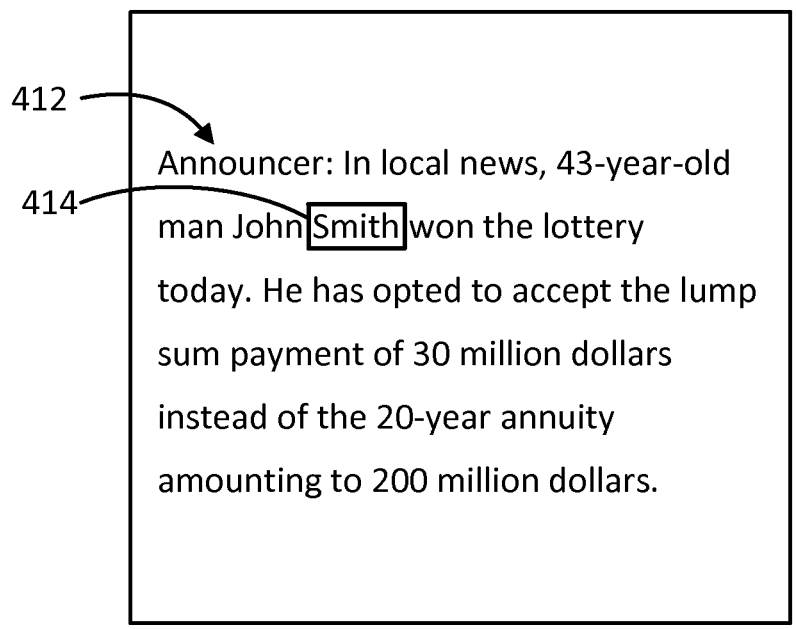
FIG. 4b is a schematic diagram illustrating second example CC-text.

FIGS. 4a and 4b are schematic diagrams illustrating example CC text. FIG. 4a includes example CC text 402. The CC text 402 may be stored in the media-program server 104. The CC text 402 may include a misspelled-term "Smmithh" 404.

In one example, the computing device 102 may identify "Smmithh" as a candidate misspelled-term. To do this, the computing device 102 may access data representing the program schedule 300 (shown in FIG. 3), and select as second text the CG-template text "John Smith" (as shown in FIG. 3). The computing device 102 may then use the text "John Smith" to identify the term "Smmithh" 404 as a candidate misspelled-term. The computing device 102 may then determine, based on the text "John Smith," that "Smith" is a candidate replacement-term.

The computing device 102 may generate and store CC text modified to have the identified candidate misspelled-term "Smmithh"404 replaced by the identified candidate replacement-term "Smith." The modified CC-text may then be stored in media-program server 104. FIG. 4b shows second example CC text 412, having the identified candidate misspelled-term "Smmithh" 404 replaced by the identified candidate replacement-term "Smith" 414.

III. Example Operations

Figure 5:
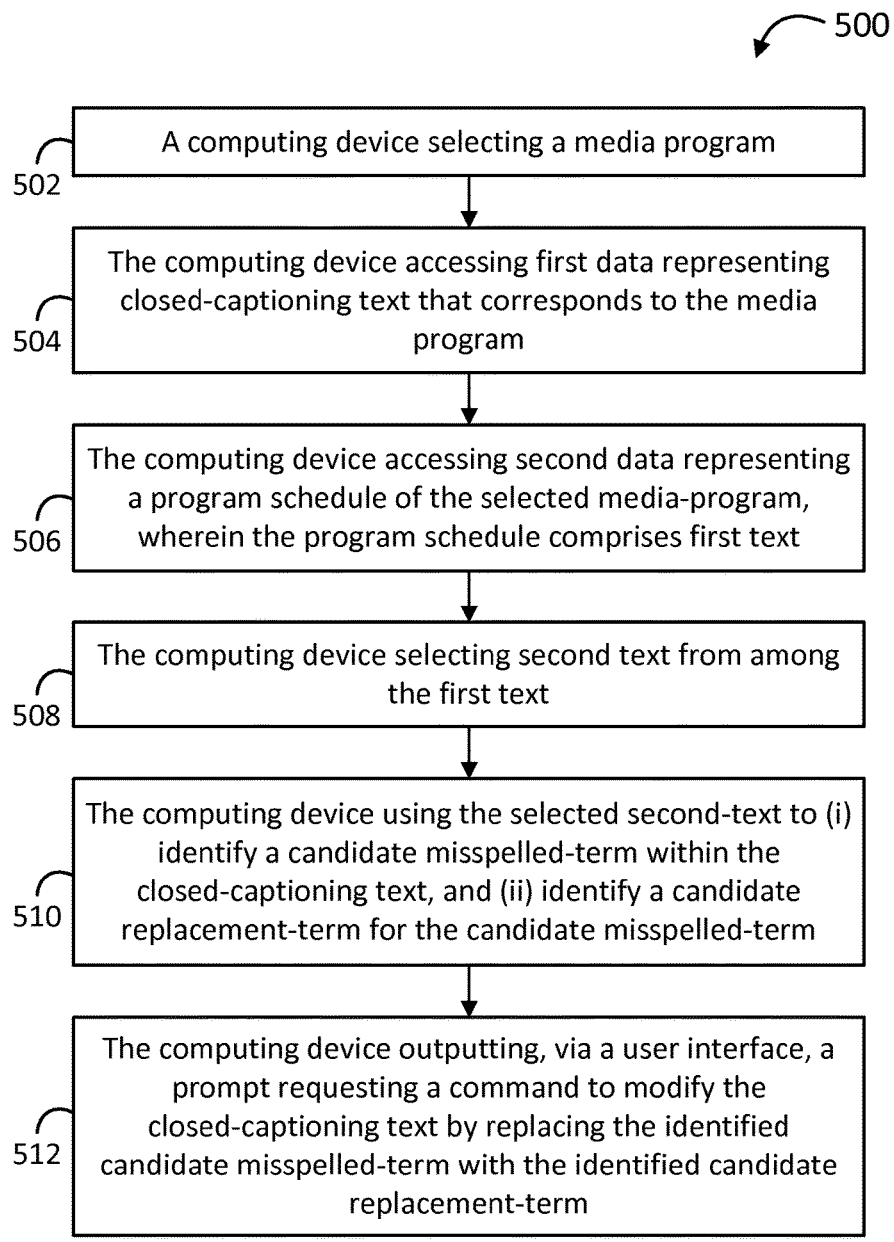
FIG. 5 is a flow chart illustrating an example method according to the present disclosure.

FIG. 5 is a flow chart illustrating an example method 500 according to the present disclosure. At block 502, the method may involve a computing device selecting a media program. The computing device may select the media program automatically. Alternatively, the computing device may select the media program based on user input received via a user interface or a communication interface, or based on an indication received via the communication interface or stored in a data storage. The media program may be a news program, a sporting event, or any other type of media program.

At block 504, the method 500 may involve the computing device accessing first data representing CC text that corresponds to the media program. In one example, the CC text corresponding to the selected media-program is stored in media-program server 104. The computing device 102 may access first data representing CC text that corresponds to the media program by communicating with the media-program server 104 via communication path 114.

At block 506, the method 500 may involve the computing device accessing second data representing a program schedule of the selected media-program, wherein the program schedule comprises first text. For instance, block 506 may involve computing device 102 accessing the program schedule 112 in the scheduling device 110. The program schedule 112 may include first text, such as text scheduled to be displayed on a teleprompter, media-program portion titles, and CG-template text, for example.

At block 508, the method 500 may involve the computing device selecting second text from among the first text. For instance, this may involve computing device 102 extracting from the first text, third text that satisfies one or more criterion, and selecting, as the second text, the extracted third-text. In some examples, the criterion may be that the third text includes a proper noun, that the third text meets a threshold length, and/or that the third text begins with a capital letter, for example. In another example, the selected second-text may be the entire first text included in the program schedule.

At block 510, the method 500 may involve the computing device using the selected second-text to (i) identify a candidate misspelled-term within the CC text, and (ii) identify a candidate replacement-term for the candidate misspelled-term. In one example, computing device 102 may identify a candidate misspelled-term by using an electronic dictionary as described above with reference to FIG. 1.

At block 510, computing device 102 may identify a candidate replacement-term for the identified candidate misspelled-term using an electronic-dictionary. The computing device 102 may then determine that the closest correctly-spelled term included in the electronic dictionary is the candidate replacement-term. Other techniques may be used to identify a candidate replacement-term for the candidate misspelled-term.

At block 512, the method 500 may involve the computing device outputting, via a user interface, a prompt requesting a command to modify the CC text by replacing the identified candidate misspelled-term with the identified candidate replacement-term. In one example, computing device 102 may include a display device, and the computing device 102 may display a prompt on the display device.

The prompt may include the identified candidate misspelled-term as well as the identified candidate replacement-term. The prompt may also request from a user a command to replace the identified candidate misspelled-term with the identified candidate replacement-term. The requested comment may be received by computing device 102 via a user interface.

Figure 6:
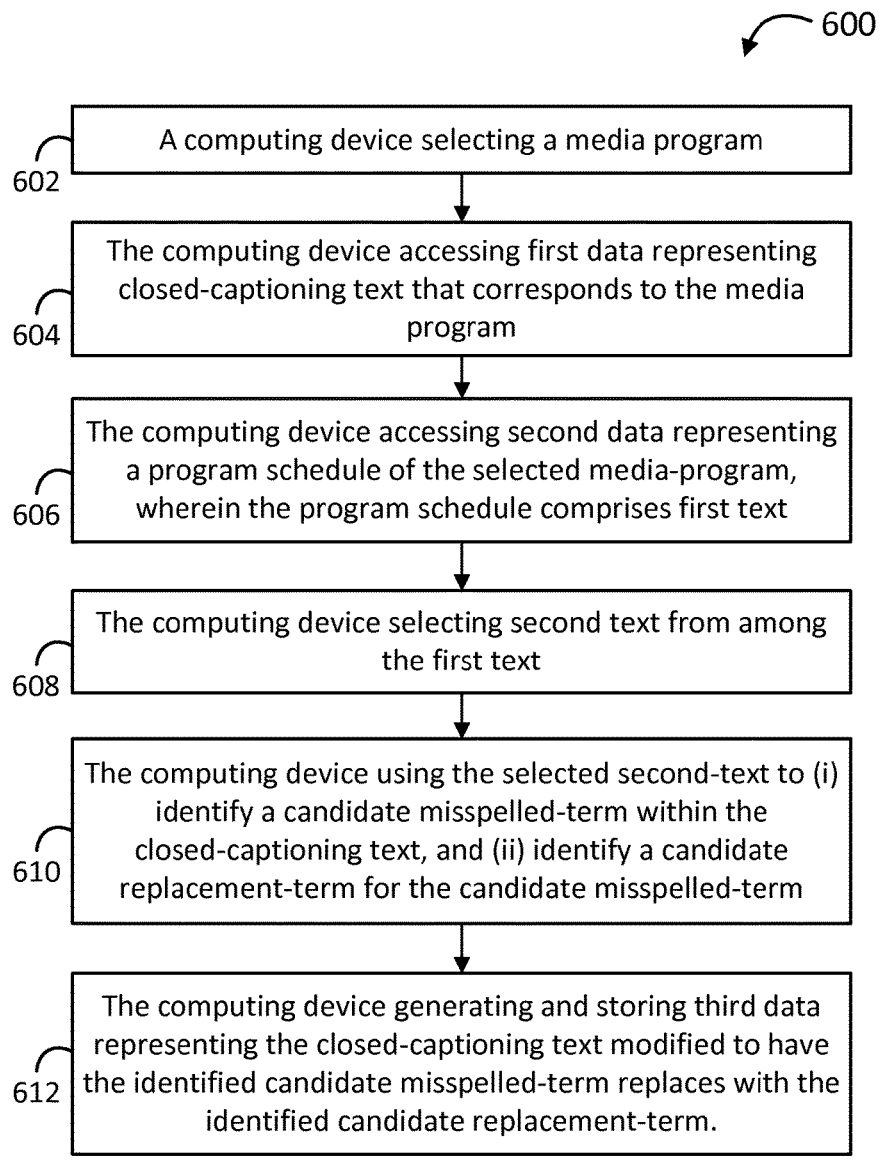
FIG. 6 is a flow chart illustrating another example method according to the present disclosure.

FIG. 6 is a flow chart illustrating an example method 600 according to the present disclosure. One or more blocks shown in FIG. 6 may be similar or identical to the blocks shown and described with reference to FIG. 5. For instance, blocks 602-610 correspond to blocks 502-510. FIG. 6 includes additional block 612.

At block 612, the method 600 may involve the computing device generating and storing third data representing the CC text modified to have the identified candidate misspelled-term replaced with the identified candidate replacement-term.

In one example, computing device 102 may generate data representing the identified candidate replacement-term. The computing device 102 may then access the first data representing CC text, replace the identified candidate misspelled-term with the identified candidate replacement-term, and store the resulting third data. The third data may be stored in the media-program server 104.

IV. Example Variations

While one or more acts have been described as being performed by certain devices, systems, or entities (e.g., computing device 102), the acts may be performed by any device, system, or entity, such as those described in connection with the system 100. Furthermore, the devices and systems need not be discrete entities. Some or all of the devices or systems may be combined in a single device.

In addition, the acts described herein need not be performed in the disclosed order, although in some examples and order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

What is claimed is:

1. A method comprising:
   a computing device selecting a media program;
   the computing device accessing closed-captioning text that corresponds to the media program;
   the computing device accessing a program schedule of the selected media program, wherein the program schedule comprises first text, and wherein the program schedule is used to produce the media program by coordinating the use of various media content items in the media program;
   the computing device selecting second text from among the first text, wherein the selected second text is different from the closed-captioning text;
   the computing device using the selected second text to (i) identify a candidate misspelled-term within the closed-captioning text, and (ii) identify a candidate replacement-term for the candidate misspelled-term; and
   the computing device outputting, via a user interface, a prompt requesting a command to modify the closed-captioning text by replacing the identified candidate misspelled-term with the identified candidate replacement-term.

2. The method of claim 1, wherein the second text comprises text included as part of a character-generator template.

3. The method of claim 1, wherein selecting second text from among the first text comprises:
   the computing device extracting, from the first text, third text that satisfies one or more criterion; and
   the computing device selecting, as the second text, the extracted third text.

4. The method of claim 3, wherein the one or more criterion comprises a criterion that the third text comprises a proper noun.

5. The method of claim 1,
   wherein using the selected second text to (i) identify the candidate misspelled-term within the closed-captioning text, and (ii) identify the candidate replacement-term for the candidate misspelled-term comprises:
   modifying an electronic dictionary by adding the selected second text to the electronic dictionary; and
   using the modified electronic dictionary to (i) identify the candidate misspelled-term within the closed-captioning text, and (ii) identify the candidate replacement-term for the candidate misspelled-term.

6. The method of claim 1, further comprising:
   the computing device receiving, via the user interface, the command; and
   responsive to receiving the command, the computing device generating and storing the closed-captioning text modified to have the identified candidate misspelled-term replaced with the identified candidate replacement-term.

7. The method of claim 1, wherein outputting, via the user interface comprises outputting, via a display device.

8. The method of claim 1, wherein the media program comprises a news program.

9. A method comprising:
   a computing device selecting a media program;
   the computing device accessing closed-captioning text that corresponds to the media program;
   the computing device accessing a program schedule of the selected media program, wherein the program schedule comprises first text, and wherein the program schedule is used to produce the media program by coordinating the use of various media content items in the media program;
   the computing device selecting second text from among the first text, wherein the selected second text is different from the closed-captioning text;
   the computing device using the selected second text to (i) identify a candidate misspelled-term within the closed-captioning text, and (ii) identify a candidate replacement-term for the candidate misspelled-term; and
   the computing device generating and storing the closed-captioning text modified to have the identified candidate misspelled-term replaced with the identified candidate replacement-term.

10. The method of claim 9, wherein the second text comprises text included as part of a character-generator template.

11. The method of claim 9, wherein selecting second text from among the first text comprises:
    extracting, from the first text, third text that satisfies one or more criterion; and
    selecting, as the second text, the extracted third text.

12. The method of claim 11, wherein the one or more criterion comprises a criterion that the third text comprises a proper noun.

13. The method of claim 9, wherein using the selected second text to (i) identify the candidate misspelled-term within the closed-captioning text, and (ii) identify the candidate replacement-term for the candidate misspelled-term comprises:
  modifying an electronic dictionary by adding the selected second text to the electronic dictionary; and
  using the modified electronic dictionary to (i) identify the candidate misspelled-term within the closed-captioning text, and (ii) identify the candidate replacement-term for the candidate misspelled-term.

14. The method of claim 9, wherein the media program comprises a news program.

15. A non-transitory computer-readable medium having stored thereon program instructions that when executed cause a computing device to perform a set of acts comprising:
  selecting a media program;
  accessing closed-captioning text that corresponds to the media program;
  accessing a program schedule of the selected media program, wherein the program schedule comprises first text, and wherein the program schedule is used to produce the media program by coordinating the use of various media content items in the media program;
  selecting second text from among the first text, wherein the selected second text is different from the closed-captioning text;
  using the selected second text to (i) identify a candidate misspelled-term within the closed-captioning text, and (ii) identify a candidate replacement-term for the candidate misspelled-term; and
  outputting, via a user interface, a prompt requesting a command to modify the closed-captioning text by replacing the identified candidate misspelled-term with the identified candidate replacement-term.

16. The computer-readable medium of claim 15, wherein the second text comprises text included as part of a character-generator template.

17. The computer-readable medium of claim 15, wherein the act of selecting second text from among the first text further comprises:
  extracting, from the first text, third text that satisfies one or more criterion; and
  selecting, as the second text, the extracted third text.

18. The computer-readable medium of claim 17, wherein the one or more criterion comprises a criterion that the third text comprises a proper noun.

19. The computer-readable medium of claim 15, wherein using the selected second text to (i) identify the candidate misspelled-term within the closed-captioning text, and (ii) identify the candidate replacement-term for the candidate misspelled-term comprises:
  modifying an electronic dictionary by adding the selected second text to the electronic dictionary; and
  using the modified electronic dictionary to (i) identify the candidate misspelled-term within the closed-captioning text, and (ii) identify the candidate replacement-term for the candidate misspelled-term.

20. The computer-readable medium of claim 15, the set of acts further comprising:
  receiving, via the user interface, the command; and
  responsive to receiving the command, generating and storing the closed-captioning text modified to have the identified candidate misspelled-term replaced with the identified candidate replacement-term.

\* \* \* \* \*